Aug. 15, 1967        W. F. GESELL        3,335,737
FLUID APPARATUS
Filed May 27, 1964
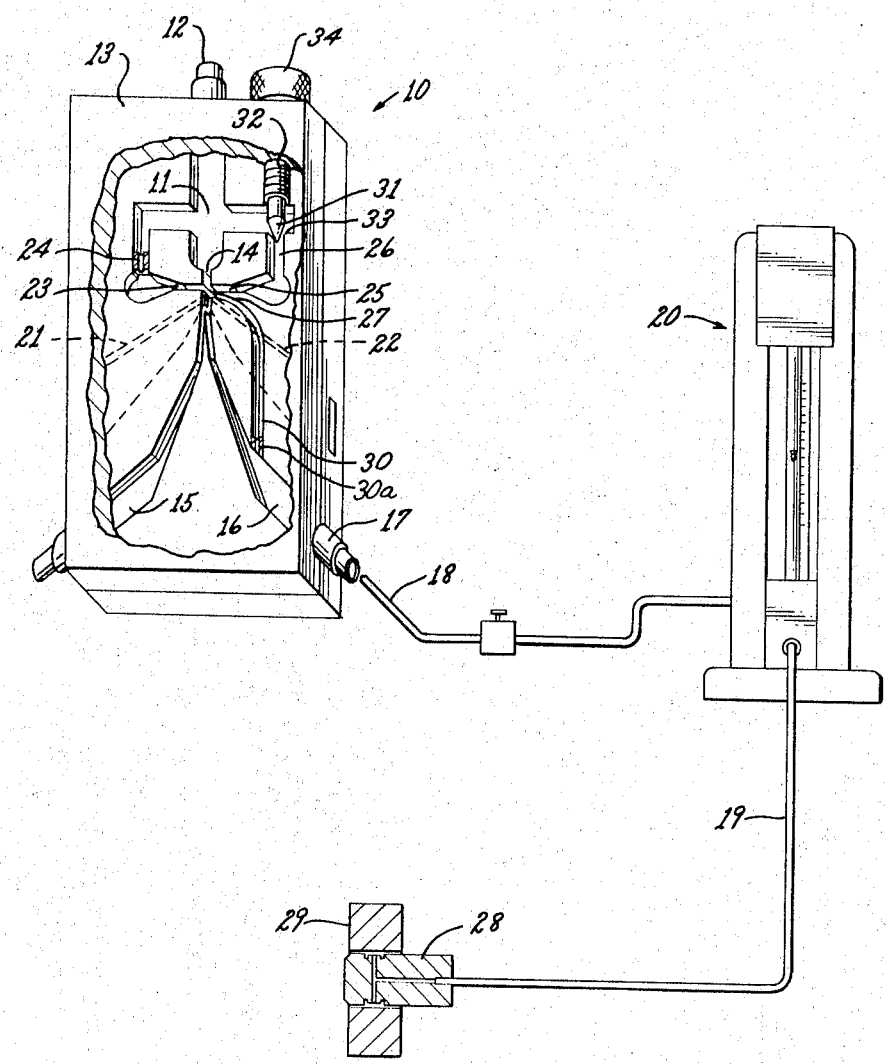
INVENTOR.
WILLIAM F. GESELL
BY Ernest J. Hy
HIS ATTORNEY

3,335,737
FLUID APPARATUS
William F. Gesell, Raleigh, N.C., assignor to The Sheffield Corporation, Dayton, Ohio, a corporation of Delaware
Filed May 27, 1964, Ser. No. 370,545
4 Claims. (Cl. 137—81.5)

This invention pertains to regulators and more particularly to fluid pressure regulators.

One object of the invention is the provision of a fluid pressure regulator having no operating moving parts which wear, malfunction or require adjustment, thus providing a regulator which is of simple and compact construction, economical to manufacture, and which provides regulated pressure with great accuracy and reliability.

Another object of the invention is the provision of a fluid pressure regulator having a supply jet for connection to a pressure source and providing a stream of fluid therefrom, and control jet means operative transversely of said stream for controlled diversion thereof between a dump means and a controlled outlet connection in accordance with pressure variations to thus maintain a regulated pressure supply to said outlet connection without involving moving operating parts in such regulation.

Another object of the invention is the provision of a regulator having an inlet therein, and outlet and dump passages arranged generally opposite said inlet, and having a common chamber connected to said inlet for supplying a main supply stream, a fixed control jet connected to said common chamber for flowing a fluid stream against and transverse said power stream, and control jet means for flowing a fluid stream against and transverse said power jet and in opposition to said fixed control jet for controlling the diversion of said supply stream between said outlet and dump passages in response to pressure variations including an adjustable connection to said chamber such that through adjustment of said adjustable connection a desired pressure is maintained at the discharge of said output passage.

Another object of the invention is the provision of a fluid pressure regulator of the character described having a plurality of outlets therefrom with one of said outlets providing the desired regulated pressure and including a supply passage connected at the discharge thereof for supplying fluid to augment the energy of said control jet means to vary the relative effectiveness of such control jet means and keep the regulation of pressure from said one outlet within an acceptable pressure range.

Other objects and advantages of the invention will be apparent from the following description, the appended claims, and the accompanying drawing, in which one embodiment of the invention is illustrated in sectional perspective view in a typical pneumatic gaging circuit for dimensional measurement.

The fluid pressure regulator of this invention includes an inlet for connection to a substantially unregulated source and a connection for supplying fluid under regulated pressure to utilization means illustrated as a pneumatic instrument for dimensional measurement. The regulator involves no moving parts such as diaphragms, valve elements, springs, and the like commonly employed in such regulators. A supply jet from the inlet is diverted between a dump outlet and an outlet leading to said connection by transverse control jet means responding to pressure variations in the operating flow path to maintain pressure to said connection constant. Said control jet means includes a bias acting against the fluid stream from said supply jet, said bias may be produced by geometrical arrangements of the other fluid passages or by bias jet 23 as illustrated in this exemplary embodiment; and opposing jet means connected for response to both inlet and outlet pressure variation for optimum control. A manual adjustment can be provided in the control jet connection to the inlet to set the regulated pressure level where this is desirable.

In the illustrated embodiment of the invention a regulator 10 is depicted in sectional perspective. Unregulated air under pressure is provided to a chamber 11 through an inlet 12 in housing 13 of regulator 10. The major volume of fluid entering chamber 11 exits therefrom through a supply jet 14 which generates a fluid stream of high velocity. The stream exits the regulator through controlled diversion between dump means including passage 15 and a useable fluid outlet 16 in said housing. A connection 17 is provided for communicating outlet 16 to a fluid line 18 which is connected to utilization means illustrated in this exemplary embodiment as an air column instrument 20 of the type shown and described in U.S. Patent No. 2,749,742. Instrument 20 is connected through a line 19 to a gaging spindle 28 shown in cross section and a float in such instrument responds in a known manner to air flow between the spindle and workpiece 29 to thus provide a size relationship of such workpiece with a standard.

The larger portion of the flow is through either dump passage 15 or outlet 16 although under some operating conditions there may be some momentary flow through passages 21 and/or 22. The flow through dump passage 15 and outlet passage 16 is controlled by control jet means arranged generally transverse said supply jet 14 and positioned to flow fluid thereagainst downstream of the supply jet. The control jet means includes a bias jet 23 communicating with chamber 11 and arranged to direct fluid against and transverse the stream to provide a fixed bias thereagainst. Generally a fixed restrictor 24, sized by the regulator requirements, may be included in the passage to the bias jet.

A control jet 25 with communicating first passage means including a passage 26 to chamber 11 in housing 13 is arranged to direct fluid against and transverse said stream in opposition to bias jet 23. Control jet 25 is responsive to changes in inlet pressure to control the diversion of the stream exiting supply jet 14.

In the illustrated embodiment a second control jet 27 is arranged in housing 13 to augment the energy of control jet 25. Control jet 27 communicates through second passage means including passage 30 with outlet 16 thus responding to outlet pressure changes to also control the diversion of the stream from supply jet 14. Passage 30 preferably includes restrictor 30a therein.

Flow through passage 26 is controlled by manually adjustable restrictor means including valve element 31 fixed to a threaded member 32 which engages a threaded portion in housing 13. Valve element 31 cooperates with a surface 33 in housing 13 at the entrance of passage 26 to set the level of desired pressure regulation.

A knob 34 is fixed to member 32 to enable adjustment of element 31 with respect to surface 33 and set the desired pressure.

Thus it will be seen that in the illustrated embodiment of the invention an increase in inlet pressure increases the energy of control jet 25 to divert more of the stream exiting supply jet 14 toward dump passage 15. Likewise, a decrease in the pressure in chamber 11 reduces the energy of control jet 25 and thus permits greater flow from outlet passage 16.

In a similar manner as the pressure in outlet passage 16 changes it causes a proportional change, as above described with respect to control jet 25, of the energy level of the fluid flowing through a passage 30 to control jet 27. This results in adjustment of the pressure in outlet 16 as a function of pressure changes therein.

Thus it will be seen that this invention provides a fluid pressure regulator having no moving parts which wear, malfunction or require adjustment, which is of simple compact construction, economical to manufacture and in which pressure changes vary the energy of the control jets to thus provide a desired level of regulated pressure in outlet passage 16 with great accuracy and reliability.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A fluid pressure regulator comprising,
    a housing,
    a fluid inlet in said housing for connection to a source of fluid under pressure,
    a supply jet communicating with said fluid inlet for providing a stream of fluid,
    fluid dump means in said housing arranged generally opposite said supply jet for dumping unregulated flow received from said stream,
    a fluid outlet in said housing arranged generally opposite said supply jet for receiving useable flow from said supply jet and connection to utilization means,
    a bias jet having a passage leading from said fluid inlet and directed to flow fluid against and transverse said stream in a direction to provide a fixed bias thereagainst toward said fluid outlet,
    and control jet means having passages leading from both said inlet and said fluid outlet and directed to flow fluid against and transverse said stream in opposition to said bias jet and toward said fluid dump means to change the effectiveness of said bias jet in response to pressure changes in said inlet and said outlet conditions to control the diversion of said stream between said dump means and said outlet in an infinite proportional manner to thus regulate the pressure from said outlet.

2. A fluid pressure regulator comprising,
    a housing,
    a fluid inlet in said housing for connection to a source of fluid under pressure and terminating in a common supply chamber in said housing,
    a supply jet communicating with said common chamber for providing a stream of fluid,
    fluid dump means in said housing arranged generally opposite said supply jet for dumping unregulated fluid received from said stream,
    a fluid outlet in said housing arranged generally opposite said supply jet for receiving useable flow therefrom and connection to utilization means,
    a bias jet having a passage leading from said chamber and directed to flow fluid against and transverse said stream in a direction to provide a fixed bias thereagainst toward said fluid outlet,
    control jet means directed to flow fluid against and transverse said stream in opposition to said bias jet and towards said fluid dump means,
    first passage means connecting said common chamber and said control jet means wherein inlet pressure changes are transmitted to said control jet means for controlled diversion of said supply jet,
    second passage means connecting said outlet and said control jet means wherein outlet pressure changes are transmitted to said control jet means for controlled diversion of said supply jet,
    and manually adjustable restrictor means in said first passage means for setting the level of pressure regulation and hence the diversion of said stream between said dump means and said outlet to thus regulate the pressure from said outlet.

3. A fluid pressure regulator comprising,
    a housing,
    a fluid inlet in said housing for connection to a source of fluid under pressure and terminating in a common supply chamber in said housing,
    a supply jet communicating with said common chamber for providing a stream of fluid,
    fluid dump means in said housing arranged generally opposite said supply jet for dumping unregulated fluid received from said stream,
    a fluid outlet in said housing arranged generally opposite said supply jet for receiving useable flow therefrom and connection to utilization means,
    a bias jet having a passage leading from said chamber and directed to flow fluid against and transverse said stream in a direction to provide a fixed bias thereagainst toward said fluid outlet,
    control jet means directed to flow fluid against and transverse said stream in opposition to said bias jet and towards said fluid dump means,
    first passage means connecting said common chamber and said control jet means wherein inlet pressure changes are transmitted to said control jet means for controlled diversion of said supply jet,
    and second passage means connecting said outlet and said control jet means wherein outlet pressure changes are transmitted to said control jet means for controlled diversion of said supply jet, whereby the pressure of fluid delivered from said outlet is regulated in response to both inlet and outlet pressure to a desired level.

4. A fluid pressure regulator comprising,
    a housing,
    a fluid inlet in said housing for connection to a source of fluid under pressure and terminating in a common supply chamber in said housing,
    a supply jet communicating with said common chamber for providing a stream of fluid,
    fluid dump means in said housing arranged generally opposite said supply jet for dumping unregulated fluid received from said stream,
    a fluid outlet in said housing arranged generally opposite said supply jet for receiving useable flow therefrom and connection to utilization means,
    a bias jet having a passage leading from said chamber and directed to flow fluid against and transverse said stream in a direction to provide a fixed bias thereagainst toward said fluid outlet,
    a first control jet having a passage leading from said common chamber and directed to flow fluid against and transverse said stream toward said fluid dump means and in opposition to said bias jet and responsive to inlet pressure changes for controlled diversion of said supply jet,
    a second control jet directed to augment the energy of said first control jet having a passage leading from said outlet and responsive to outlet pressure changes for controlled diversion of said supply jet,
    and manually adjustable restrictor means in said passage between said common chamber and said first control jet for setting the level of pressure regulation whereby through adjustment of said restrictor said stream is proportioned as desired between said dump means and said outlet to regulate the pressure from said outlet.

(References on following page)

References Cited

UNITED STATES PATENTS

| | | | |
|---|---|---|---|
| 3,001,539 | 9/1961 | Hurvitz | 137—81.5 |
| 3,078,675 | 2/1963 | Baldwin | 137—81.5 |
| 3,144,309 | 8/1964 | Sparrow | 137—81.5 |
| 3,171,421 | 3/1965 | Joesting | 137—81.5 |
| 3,187,763 | 6/1965 | Adams | 137—81.5 |
| 3,220,428 | 11/1965 | Wilkerson | 137—81.5 |

OTHER REFERENCES

"Fluid Oscillator," A. E. Mitchell, I.B.M. Technical Bulletin, vol. 5, No. 6, November 1962, page 25.

M. CARY NELSON, *Primary Examiner.*

S. SCOTT, *Assistant Examiner.*